United States Patent
Shim (10) Patent No.: US 9,164,677 B2
(45) Date of Patent: Oct. 20, 2015

(54) SYSTEMS AND METHODS FOR DMA CONTROLLER FOR CHECKING THE STATUS OF METADATA PRIOR TO OR SIMULTANEOUSLY WHEN TRANSFERRING DATA TO HOST

(71) Applicant: Samsung Electronics Co., Ltd., Suwon-Si, Gyeonggi-Do (KR)

(72) Inventor: Hojun Shim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/095,177

(22) Filed: Dec. 3, 2013

(65) Prior Publication Data

US 2014/0156880 A1 Jun. 5, 2014

(30) Foreign Application Priority Data

Dec. 3, 2012 (KR) .................. 10-2012-0139139

(51) Int. Cl.
- *G06F 3/00* (2006.01)
- *G06F 13/00* (2006.01)
- *G06F 3/06* (2006.01)
- *G06F 13/16* (2006.01)

(52) U.S. Cl.
CPC ............. *G06F 3/061* (2013.01); *G06F 3/0656* (2013.01); *G06F 3/0659* (2013.01); *G06F 3/0679* (2013.01); *G06F 13/1668* (2013.01)

(58) Field of Classification Search
CPC ................................ G06F 3/061; G06F 3/0656
USPC ...................................... 710/22; 711/118, 144
See application file for complete search history.

(56) References Cited

U.S. PATENT DOCUMENTS

| | | | |
|---|---|---|---|
| 6,715,036 B1 * | 3/2004 | Burton et al. | ........ 711/118 |
| 6,928,521 B1 * | 8/2005 | Burton et al. | ........ 711/144 |
| 7,379,379 B2 | 5/2008 | Yamagami et al. | |
| 7,640,412 B2 * | 12/2009 | Molaro et al. | ........ 711/162 |
| 2010/0077117 A1 | 3/2010 | Asnaashari | |
| 2010/0088467 A1 | 4/2010 | Lee et al. | |
| 2010/0257519 A1 | 10/2010 | Chang | |
| 2010/0268871 A1 | 10/2010 | Lee et al. | |
| 2011/0072187 A1 | 3/2011 | Forhan et al. | |
| 2011/0231622 A1 | 9/2011 | Kawamura et al. | |
| 2011/0264848 A1 | 10/2011 | Suzuki | |
| 2012/0072801 A1 | 3/2012 | Takeuchi et al. | |
| 2012/0117311 A1 | 5/2012 | Hong | |

FOREIGN PATENT DOCUMENTS

KR 10-0672996 B1 1/2007

* cited by examiner

*Primary Examiner* — Tammara Peyton
(74) *Attorney, Agent, or Firm* — Harness, Dickey & Pierce, P.L.C.

(57) ABSTRACT

A memory controller is provided which includes a host interface configured to provide an interface for communication with a host; a buffer memory configured to store user data and metadata of the user data; and a DMA controller configured to access the buffer memory to check the metadata and to provide user data corresponding to a logical block address requested from a host to the host interface according to the checking result. The metadata includes status information of the user data stored at the buffer memory. Before providing the host interface with user data corresponding to a first logical block address requested from the host, the DMA controller checks metadata of user data corresponding to a second logical block address requested from the host.

20 Claims, 8 Drawing Sheets

| Add. | Descriptions | | | | | | | | | | | | | | | |
|---|---|---|---|---|---|---|---|---|---|---|---|---|---|---|---|---|
| | D31 | D30 | D29 | D28 | D27 | D26 | D25 | D24 | D23 | D22 | D21 | D20 | D19 | D18 | D17 | D16 |
| | D15 | D14 | D13 | D12 | D11 | D10 | D09 | D08 | D07 | D06 | D05 | D04 | D03 | D02 | D01 | D00 |
| 0000 | Don't Care (No usage) | | | | | | | | | | | | | | | |
| | Don't Care (No usage) | | | | | | | | | | | | | UECC | CRCed | Valid |
| | CRC Seed | | | | | | | | | | | | | | | |
| 0004 | CRC Parity | | | | | | | | | | | | | | | |

SYSTEMS AND METHODS FOR DMA CONTROLLER FOR CHECKING THE STATUS OF METADATA PRIOR TO OR SIMULTANEOUSLY WHEN TRANSFERRING DATA TO HOST

CROSS-REFERENCE TO RELATED APPLICATIONS

A claim for priority under 35 U.S.C. §119 is made to Korean Patent Application No. 10-2012-0139139 filed Dec. 3, 2012, in the Korean Intellectual Property Office, the entire contents of which are hereby incorporated by reference.

BACKGROUND

Example embodiments of the inventive concepts described herein relate to a memory controller and an operating method thereof.

A semiconductor memory device is a memory device which is fabricated using semiconductors such as silicon (Si), germanium (Ge), gallium arsenide (GaAs), indium phosphide (InP), and so on. Semiconductor memory devices are classified into volatile memory devices and nonvolatile memory devices.

The volatile memory devices may lose stored contents at power-off. The volatile memory devices include a static RAM (SRAM), a dynamic RAM (DRAM), a synchronous DRAM (SDRAM), and the like. The nonvolatile memory devices may retain stored contents even at power-off. The nonvolatile memory devices include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and so on.

The semiconductor memory device may be controlled by a memory controller according to a request from a host. The memory controller may communicate with the host through a host interface. That is, the memory controller may write or read data to or from the semiconductor memory device according to the host request. The nonvolatile memory device and the memory controller may constitute a data storage device. As an operating speed of a host increases and a bandwidth of the host interface improves, there may be a demand for increased performance of the memory controller.

SUMMARY

At least one example embodiment of the inventive concepts is directed to provide a memory controller.

In one example embodiment, the memory controller includes a host interface configured to provide an interface for communication with a host; a buffer memory configured to store user data and metadata of the user data; and a DMA controller configured to access the buffer memory to check the metadata and to provide user data corresponding to a logical block address requested from a host to the host interface according to the checking result, wherein the metadata includes status information of the user data stored at the buffer memory; and wherein before providing the host interface with user data corresponding to a first logical block address requested from the host, the DMA controller checks metadata of user data corresponding to a second logical block address requested from the host.

In one example embodiment, after providing the host interface with user data corresponding to the first logical block address, the DMA controller provides the host interface with metadata of user data corresponding to the second logical block address.

In one example embodiment, when a checking result of the metadata indicates that user data corresponding to the metadata is valid, the DMA controller provides the user data to the host interface.

In one example embodiment, the metadata includes valid information of the user data, CRC information, and ECC information.

In one example embodiment, the buffer memory is a volatile memory.

In one example embodiment, the buffer memory includes a first buffer memory and a second buffer memory, the first buffer memory being a DRAM and the second buffer memory being an SRAM.

In one example embodiment, the user data is stored at the first buffer memory and the metadata is stored at the second buffer memory.

In one example embodiment, the host interface is a PCIe interface.

Another example embodiment of the inventive concepts is directed to an operating method of a memory controller.

In one example embodiment, the method includes operations: (a) receiving a read request for user data corresponding to a first logical block address from a host; (b) receiving a read request for user data corresponding to a second logical block address from the host; (c) checking metadata of user data corresponding to the first logical block address; (d) checking metadata of user data corresponding to the second logical block address; (e) transferring the user data corresponding to the first logical block address to the host; and (f) transferring the user data corresponding to the second logical block address to the host.

In one example embodiment, the operations (a) and (b) are performed at the same time.

In one example embodiment, the operation (b) is performed after the operation (c).

In one example embodiment, the operating method further comprises an operation (g) determining whether the user data corresponding to the first logical block address is valid, the operation (g) being performed after the operation (c).

In one example embodiment, the operating method further includes an operation (h) determining whether the user data corresponding to the second logical block address is valid, the operation (h) being performed after the operation (d).

In one example embodiment, at the operations (e) and (f), the user data is transferred to the host using a PCIe interface.

In one example embodiment, the metadata includes valid information of the user data, CRC information, and ECC information.

In one embodiment, the memory controller includes a buffer memory configured to store user data and associated metadata therein, the metadata indicating whether the associated user data is corrupted; a memory controller configured to, receive a request from a host for a plurality of the user data; determine if each of the plurality of user data in the request is corrupted based on the associated metadata prior to or simultaneously with transferring a first user data of the plurality of user data to the host.

In one embodiment, the memory controller is configured to determine if the plurality of user data is corrupted by, checking metadata associated with the first user data, and checking metadata associated with a second user data of the plurality of user data, and the memory controller is further configured to transfer the first user data to the host after or simultaneously with the checking of the metadata associated with the second user data.

In one embodiment, the memory controller determines whether each of the plurality of user data in the request is corrupted by reading a validity bit of associated metadata stored in the buffer memory.

In one embodiment, the memory controller further includes a host interface configured to send the requested plurality of user data whose associated metadata has been checked by the memory controller to the host.

In one embodiment, a storage device includes the memory controller and a nonvolatile memory configure to provide the user data to the buffer memory via a bus.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Example embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the example embodiments of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
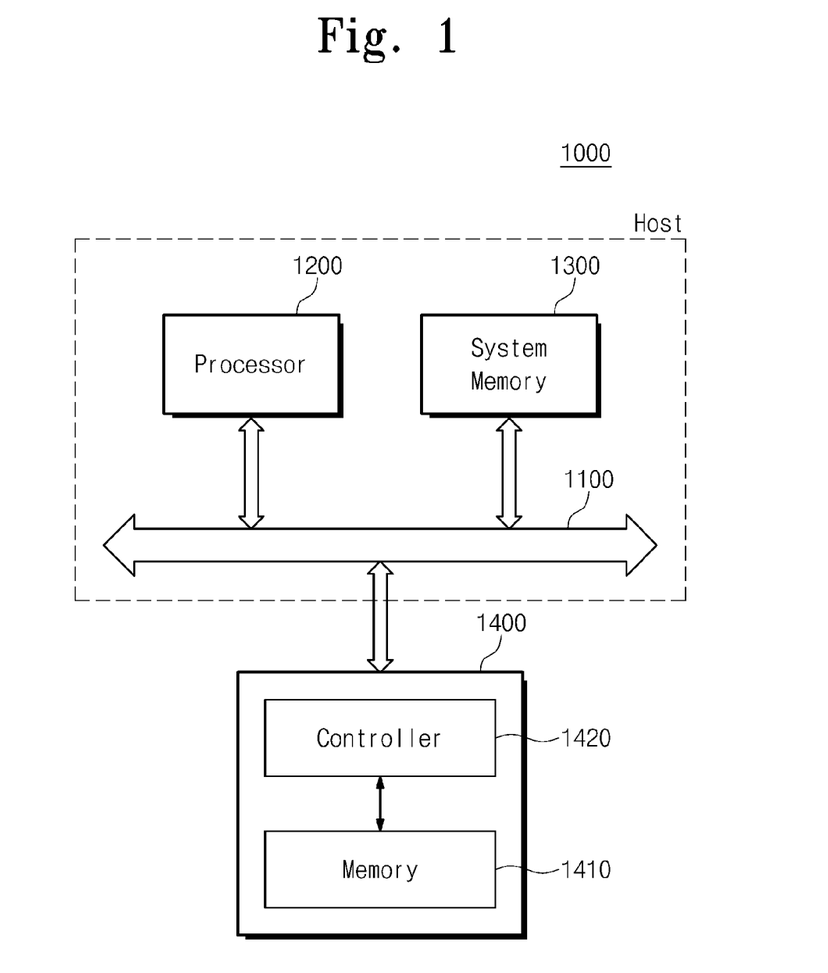
FIG. 1 is a block diagram schematically illustrating a computing system according to an example embodiment of the inventive concepts.

FIG. 1 is a block diagram schematically illustrating a computing system according to an example embodiment of the inventive concepts.

Referring to FIG. 1, a computing system 1000 may include a bus 1100, a processor 1200, a system memory 1300, and a storage device 1400.

The bus 1100 may provide a channel between constituent elements of the computing system 1000. For example, the bus 1100 may provide a channel between the processor 1200, the system memory 1300, and the storage device 1400. The bus 1100 may operate based on a standardized interface of the computing system 1000. For example, the bus 1100 may operate based on a PCIe (Peripheral Component Interconnect express) interface. However, the bus 1100 may not be limited to the PCIe interface. The bus 1100 may be applied to devices which operate based on various interfaces providing channels between various constituent elements.

The processor 1200 may be configured to control constituent elements of the computing system 1000 through the bus 1100. For example, the processor 1200 may control the system memory 1300 and the storage device 1400 through the bus 1100. The processor 1200 may control the system memory 1300 and the storage 1400 based on the PCIe interface. The processor 1200 may include a general purpose processor or an application processor.

The system memory 1300 may be configured to communicate with the processor 1200 and the storage device 1400 through the bus 1100. For example, the system memory 1300 may communicate with the processor 1200 and the storage 1400 based on the PCIe interface. The system memory 1300 may include a volatile memory such as an SRAM, a DRAM, an SDRAM, or the like or a nonvolatile memory such as a phase change RAM (PRAM), a magnetic RAM (MRAM), a resistive RAM (RRAM), a ferroelectric RAM (FRAM), or the like.

The components 1100, 1200 and 1300 may constitute a host. For example, the host may request required data stored at the storage device 1400.

The storage device 1400 may be configured to communicate with the processor 1200 and the system memory 1300 through the bus 1100. For example, the storage 1400 may communicate with the processor 1200 and the system memory 1300 based on the PCIe interface. The storage device 1400 may be used to retain data for a long time. The storage device 1400 may include a nonvolatile memory 1410 and a memory controller 1420.

The nonvolatile memory 1410 may include at least one of nonvolatile memories such as a flash memory, a phase change RAM (PRAM), a magnetic RAM (MRAM), a resistive RAM (RRAM), a ferroelectric RAM (FRAM), and the like.

The memory controller 1420 may communicate with a host through a host interface. For example, the memory controller 1420 may communicate with the processor 1200 and the system memory 1300 through the bus 1100 and control the nonvolatile memory 1410.

The memory controller 1420 may include an interface which is recognized as storage by the bus 1100 or the processor 1200. For example, if the storage 1400 is connected with the bus 1100, the memory controller 1420 may perform communication with the processor 1200 or the bus 1100. According to a result of the communication, the storage 1400 may be recognized as storage by the bus 1100 or the processor 1200. That is, the memory controller 1420 may communicate with the processor 1200 and the system memory 1300 based on a standardized interface (e.g., PCIe) of the computing system 1000, and may include an interface which is recognized as storage by the bus 1100 or the processor 1200.

Figure 2:
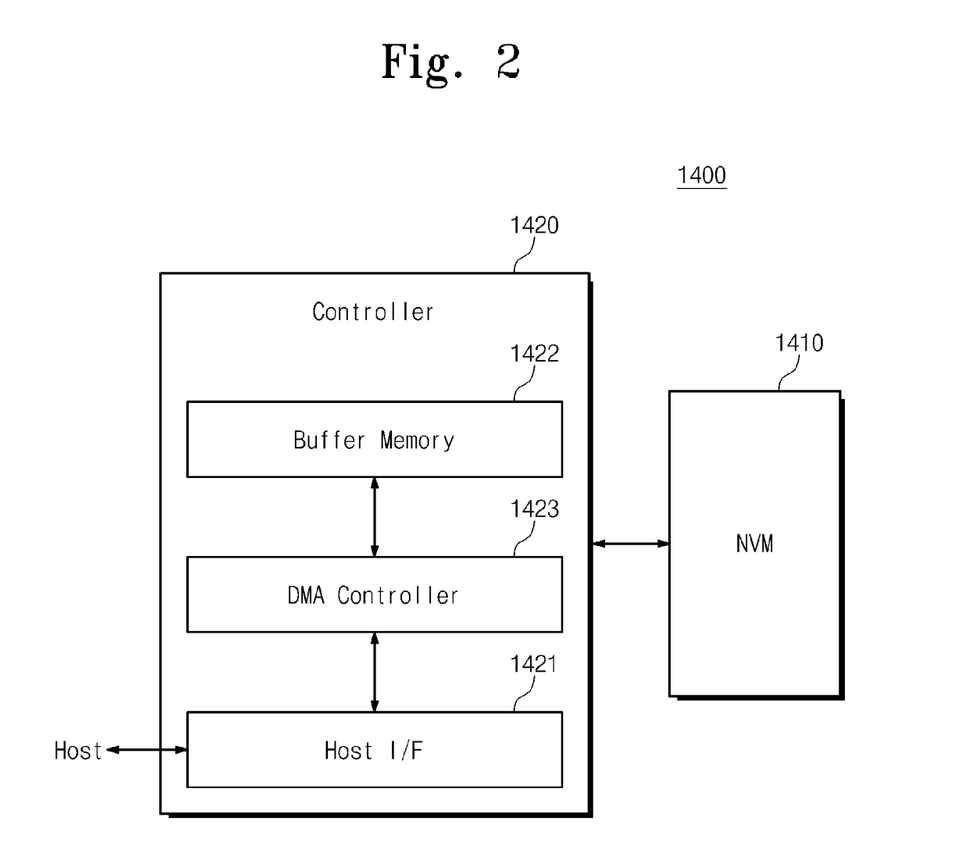
FIG. 2 is a block diagram schematically illustrating a storage device including a memory controller according to an example embodiment of the inventive concepts.

FIG. 2 is a block diagram schematically illustrating a storage device including a memory controller according to an example embodiment of the inventive concepts.

Referring to FIG. 2, a storage device 1400 may include the nonvolatile memory 1410 and the memory controller 1420.

The nonvolatile memory 1410 may be controlled by the memory controller 1420, and may store data transferred from an external device (e.g., a host). Below, it is assumed that the nonvolatile memory 1410 is a NAND flash memory.

The memory controller 1420 may include a host interface 1421, a buffer memory 1422, and a DMA controller 1423.

The memory controller 1420 may write or read data to or from the nonvolatile memory 1410 in response to a request of the external device. For example, the memory controller 1420 may read user data, corresponding to a logical block address LBA provided from the host, from the nonvolatile memory 1410. The logical block address LBA may correspond to a sector of the nonvolatile memory 1410, for example. The read user data may be stored at the buffer memory 1422 in the memory controller 1420.

The host interface 1421 may provide an interface which enables the memory controller 1420 to communicate with the host. The host interface 1421, for example, may be a PCIe (Peripheral Component Interconnect express) interface.

Under a control of the memory controller 1420, the buffer memory 1422 may store user data read from the nonvolatile memory 1410 and metadata including status information on the user data. The buffer memory 1422 may be a volatile memory such as a DRAM or an SRAM.

In general, metadata including ECC (Error Correction Code) on stored user data may be stored at a memory cell array (not shown) of the nonvolatile memory 1410. In contrast, in one or more example embodiments, the metadata is stored at the buffer memory 1422 and may include metadata information, CRC (Cycle Redundancy Check) information, and user data validity information on user data loaded onto the buffer memory 1422 as will be more fully described with reference to FIG. 6.

The DMA controller 1423 may access the buffer memory 1422 in response to a host request. The DMA controller 1423 may check metadata stored at the buffer memory 1422. For example, the DMA controller 1423 may check metadata on user data corresponding to a logical block address LBA requested from the host. If the checking result indicates that user data is valid, the DMA controller 1423 may provide the host interface 1421 with user data corresponding to the logical block address LBA requested from the host. The user data may be transferred to the host via the host interface 1421.

The host may request a plurality of user data. For example, the host may request first user data corresponding to a first logical block address of the nonvolatile memory 1410 and second user data corresponding to a second logical block address of the nonvolatile memory 1410. The nonvolatile memory 1410 may be a NAND flash memory, and therefore, the first logical block address and the second logical block address may correspond to different sectors of the NAND flash memory.

The DMA controller 1423 may check metadata associated with the second user data corresponding to the second logical block address before the first user data corresponding to the first logical block address is sent to the host interface 1421. For example, the DMA controller 1423 may access the buffer memory 1422 to check metadata associated with the first user data. The DMA controller 1423 may access the buffer memory 1422 to check metadata associated with the second user data. In the event that the first user data is valid, the DMA controller 1423 may provide the host interface 1421 with the first user data. In the event that the second user data is valid, the DMA controller 1423 may provide the host interface 1421 with the second user data.

With the above description, the DMA controller 1423 may reduce a time taken to process the second user data requested by the host. The reason may be that because the second user data is checked in advance (e.g. before providing the host with the first user data), the DMA controller 1423 may provide the second user data to the host interface 1421 after providing the first user data to the host interface 1421, without having to check the metadata associated with the second user data. Therefore, the performance of the memory controller 1420 may be improved.

Figure 3:
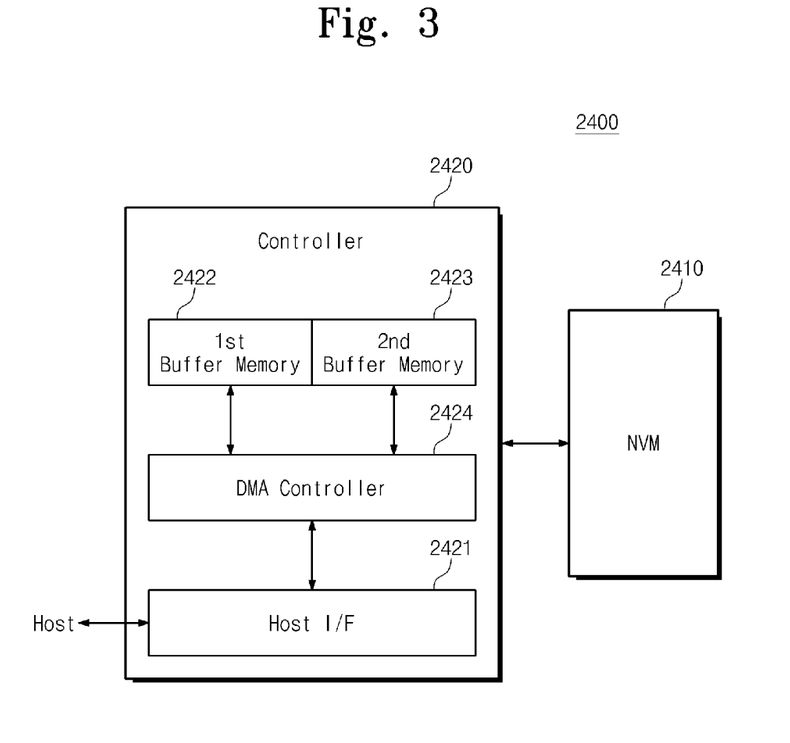
FIG. 3 is a block diagram schematically illustrating a storage device including a memory controller according to another example embodiment of the inventive concepts.

FIG. 3 is a block diagram schematically illustrating a storage device including a memory controller according to another example embodiment of the inventive concepts.

Referring to FIG. 3, a storage device 2400 may include a nonvolatile memory 2410 and a memory controller 2420. The nonvolatile memory 2410 may be substantially the same as a nonvolatile memory 1410 described in FIG. 2.

The memory controller 2420 may include a host interface 2421, a first buffer memory 2422, a second buffer memory 2423, and a DMA controller 2424.

The host interface 2421 may provide an interface which enables the memory controller 2420 to communicate with the host. The host interface 2421, for example, may be a PCIe (Peripheral Component Interconnect express) interface.

The first buffer memory 2422 may store user data read from the nonvolatile memory 2410.

The second buffer memory 2423 may store metadata associated with user data stored at the first buffer memory 2422.

The first buffer memory 2422 and the second buffer memory 2423 may be formed of a volatile memory. An operating speed of the second buffer memory 2423 may be faster than that of the first buffer memory 2422. For example, the first buffer memory 2422 may be formed of a DRAM, and the second buffer memory 2423 may be formed of an SRAM. However, example embodiments are not limited thereto.

The DMA controller 2424 may access the first and second buffer memories 2422 and 2423 in response to a host request. The DMA controller 2424 may check metadata stored at the second buffer memory 2423 For example, if the checking result indicates that user data is valid, the DMA controller 2424 may provide the host interface 2421 with user data corresponding to a logical block address LBA requested from the host. The user data may be transferred to the host via the host interface 2421.

The host may request a plurality of user data. For example, the host may request first user data corresponding to a first logical block address of the nonvolatile memory 2410 and second user data corresponding to a second logical block address of the nonvolatile memory 2410. The nonvolatile memory 2410 may be a NAND flash memory, and therefore, the first logical block address and the second logical block address may correspond to different sectors of the NAND flash memory.

The DMA controller 2424 may check metadata on user data corresponding to the second logical block address after user data corresponding to the first logical block address is sent to the host interface 2421. For example, the DMA controller 2424 may access the second buffer memory 2423 to check metadata associated with the first user data. In the event that the first user data is valid, the DMA controller 2424 may provide the host interface 2421 with the first user data. The DMA controller 2424 may again access the second buffer memory 2423 to check metadata associated with the second user data. In the event that the second user data is valid, the DMA controller 2424 may provide the host interface 2421 with the second user data.

With the above description, the DMA controller 2424 may reduce a time taken to process the first user data and the second user data requested by the host. The reason may be that there is reduced a time taken to access the second buffer memory 2423 to check metadata associated with the first user data and the second user data. Therefore, the performance of the memory controller 1420 may be improved.

At another point, the DMA controller 2424 may check metadata associated with the second user data before the first user data is sent to the host interface 2421. For example, the DMA controller 2424 may access the second buffer memory 2423 to check metadata associated with the first user data. The DMA controller 2424 may again access the second buffer memory 2423 to check metadata associated with the second user data. In the event that the first user data is valid, the DMA controller 2424 may provide the host interface 2421 with the first user data. In the event that the second user data is valid, the DMA controller 2424 may provide the host interface 2421 with the second user data.

With the above description, the DMA controller 2424 may reduce a time taken to process the second user data requested from the host.

Figure 4:
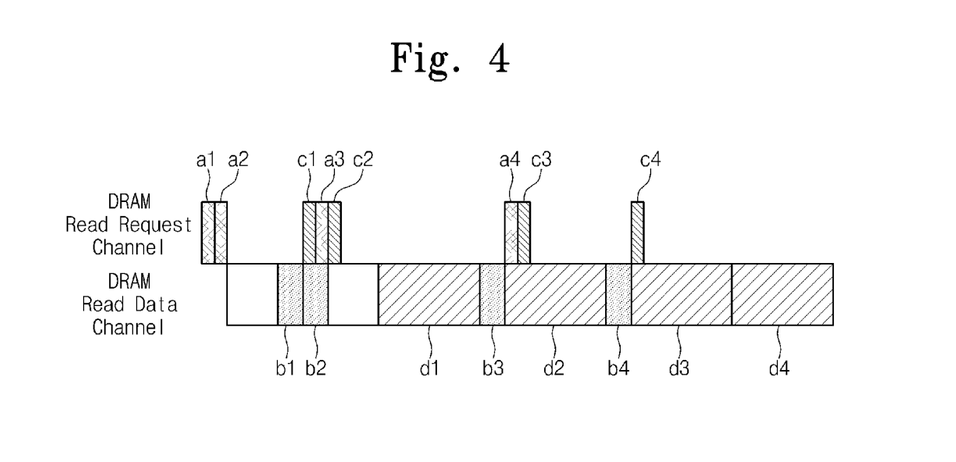
FIGS. 4 and 5 are timing diagrams illustrating an operation of a DMA controller included in the memory controller of FIG. 2.
Figure 5:
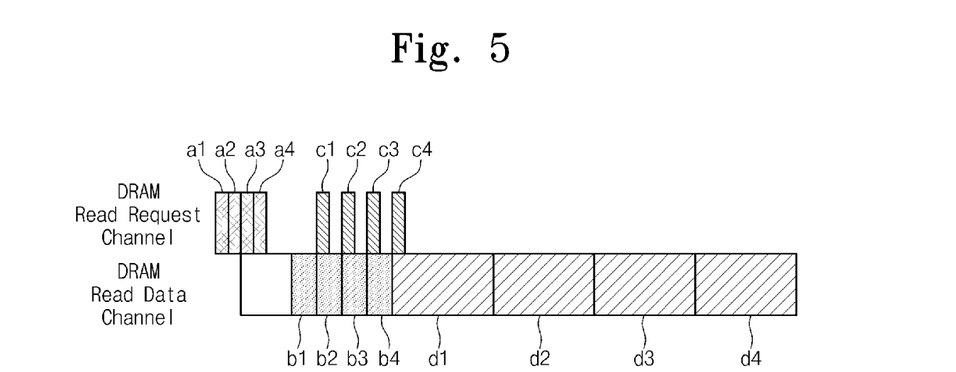

FIGS. 4 and 5 are timing diagrams illustrating an operation of the DMA controller in the memory controller of FIG. 2 according to an example embodiment.

FIGS. 4 and 5, illustrate an example in which first to fourth user data corresponding to first to fourth logical block addresses of the nonvolatile memory 1410, respectively, are requested from the host. The nonvolatile memory 1410 may be a NAND flash memory, and therefore, the first to fourth logical block addresses may correspond to different sectors of the NAND flash memory.

Referring to FIG. 4, the DMA controller 1423 may iteratively perform operations of requesting reading metadata in the buffer memory 1422, labeled as a type 'a' operation, reading metadata, labeled as a type 'b' operation, requesting reading on user data of the buffer memory 1422, labeled as a type 'c' operation, and reading user data, labeled as a type 'd' operation.

In operation a1, the DMA controller 1423 may request reading of metadata associated with the first user data. In operation a2, the DMA controller 1423 may request reading of metadata associated with the second user data. In operation b1, the DMA controller 1423 may access the buffer memory 1422 to read the metadata associated with the first user data. An interval between a1 and b1, representing a time between reading metadata and reading associated user data, may be understood to be a read latency of the buffer memory 1422. In operation b2, the DMA controller 1423 may access the buffer memory 1422 to read the metadata associated with the second user data.

In operation c1, the DMA controller 1423 may request reading of the first user data. In operation a3, the DMA controller 1423 may request reading of metadata associated with the third user data. In operation c2, the DMA controller 1423 may request reading of the second user data. In operation d1, the DMA controller 1423 may access the buffer memory 1422 to read the first user data. An interval between b1 and d1, representing a time between accessing metadata and accessing associated user data, may be understood to be an access latency of the buffer memory 1422. In operation b3, the DMA controller 1423 may access the buffer memory 1422 to read the metadata associated with the third user data.

In operation a4, the DMA controller 1423 may request reading of the metadata associated with the fourth user data. In operation c3, the DMA controller 1423 may request reading of the third user data. In operation d2, the DMA controller 1423 may access the buffer memory 1422 to read the second user data. In operation b4, the DMA controller 1423 may access the buffer memory 1422 to read the metadata associated with the fourth user data.

In operation c4, the DMA controller 1423 may request reading of the fourth user data. In operation d3, the DMA controller 1423 may access the buffer memory 1422 to read the third user data. In operation d4, the DMA controller 1423 may access the buffer memory 1422 to read the fourth user data.

In FIG. 4, there is illustrated an example in which operations b2 and c1 of the DMA controller 1423 are performed at the same time. However, example embodiments of the inventive concepts are not limited thereto. For example, the operation b2 can be performed prior to or after the operation c1. Also, in FIG. 4, there is illustrated an example in which operations d2 and a4 of the DMA controller 1423 are performed at the same time. However, example embodiments of the inventive concepts are not limited thereto. For example, the operation d2 can be performed prior to or after the operation a4. In addition, in FIG. 4, there is illustrated an example in which operations d3 and c4 of the DMA controller 1423 are performed at the same time. However, example embodiments of the inventive concepts are not limited thereto. For example, the operation d3 can be performed prior to or after the operation c4.

With the above description, the DMA controller 1423 may reduce a time taken to process the second to fourth user data corresponding to the second to fourth logical block addresses, respectively, requested from the host. The reason may be that after providing the first user data to the host interface 1421, the DMA controller 1423 may provide the second user data to the host interface 1421 without checking metadata associated with the second user data. This may mean that the performance of the memory controller 1420 is improved.

Referring to FIG. 5, in operation a1, the DMA controller 1423 may request reading of the metadata associated with the first user data. In operation a2, the DMA controller 1423 may request reading of the metadata associated with the second user data. In operation a3, the DMA controller 1423 may request reading of metadata associated with the third user data. In operation a4, the DMA controller 1423 may request reading of metadata associated with the fourth user data.

In operation b1, the DMA controller 1423 may access the buffer memory 1422 to read the metadata associated with the first user data. In operation c1, the DMA controller 1423 may request reading of the first user data. In operation b2, the DMA controller 1423 may access the buffer memory 1422 to read the metadata associated with the second user data. In operation c2, the DMA controller 1423 may request reading of the second user data. In operation b3, the DMA controller 1423 may access the buffer memory 1422 to read the metadata associated with the third user data. In operation c3, the DMA controller 1423 may request reading of the third user data. In operation b4, the DMA controller 1423 may access the buffer memory 1422 to read the metadata associated with the fourth user data.

In operation d1, the DMA controller 1423 may access the buffer memory 1422 to read the first user data corresponding to the first logical block address. In operation c4, the DMA controller 1423 may request reading of the fourth user data. In operation d2, the DMA controller 1423 may access the buffer memory 1422 to read the second user data corresponding to the second logical block address. In operation d3, the DMA controller 1423 may access the buffer memory 1422 to read the third user data corresponding to the third logical block address. In operation d4, the DMA controller 1423 may access the buffer memory 1422 to read the fourth user data corresponding to the fourth logical block address.

In FIG. 5, there is illustrated an example in which operations b2 and c1 of the DMA controller 1423 are performed at the same time. However, example embodiments of the inventive concepts are not limited thereto. For example, the operation b2 can be performed prior to or after the operation c1. Also, in FIG. 5, there is illustrated an example in which operations d3 and c2 of the DMA controller 1423 are performed at the same time. However, example embodiments of the inventive concepts are not limited thereto. For example, the operation b3 can be performed prior to or after the operation c2. In addition, in FIG. 5, there is illustrated an example in which operations b4 and c3 of the DMA controller 1423 are performed at the same time. However, example embodiments of the inventive concepts are not limited thereto. For example, the operation b4 can be performed prior to or after the operation c3.

With the above description, the DMA controller 1423 may reduce a time taken to process the second to fourth user data corresponding to the second to fourth logical block addresses, respectively, requested from the host.

Figure 6:
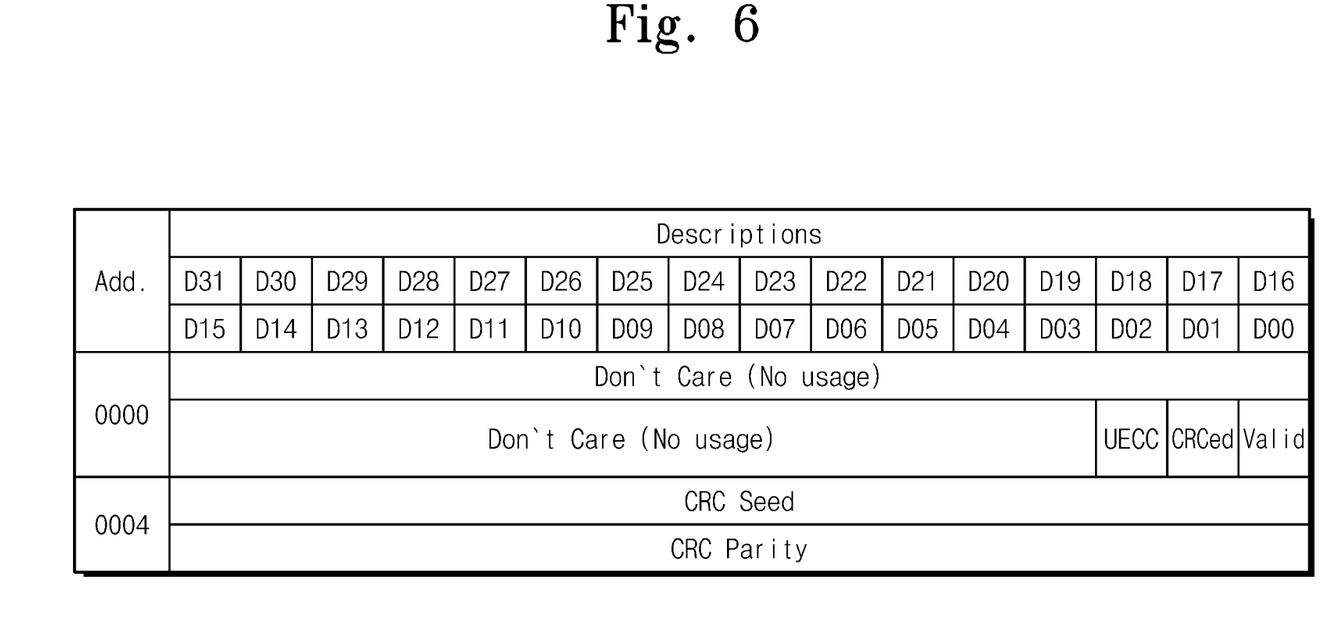
FIG. 6 is a diagram schematically illustrating a metadata structure according to an example embodiment of the inventive concepts.

FIG. 6 is a diagram schematically illustrating a metadata structure according to an example embodiment of the inventive concepts.

As illustrated in FIG. 6, the metadata may be formed of 16 bytes, however, example embodiments are not limited thereto.

A bit "UECC" may be a bit indicating whether an error of user data is correctable. The bit "UECC" may be set to 1 when an error of user data is uncorrectable.

A bit "CRCed" may be a bit indicating whether user data is checked by a CRC (Cyclic Redundancy Check) error detection manner. The bit "CRCed" may be set to 1 when user data is checked by the CRC error detection manner.

A bit "Valid" may be a bit indicating whether both user data and metadata are valid. The bit "Valid" may be set to 1 when both the user data and the metadata are valid. For example, in the event that the bit "Valid" has a value of 1, a DMA controller 1423 may provide the user data to the host interface 1421.

A bit "CRC Seed" may provide an initial value for calculating CRC parity when the bit "CRCed" is set to 1. The CRC parity may indicate a calculated parity value.

Figure 7:
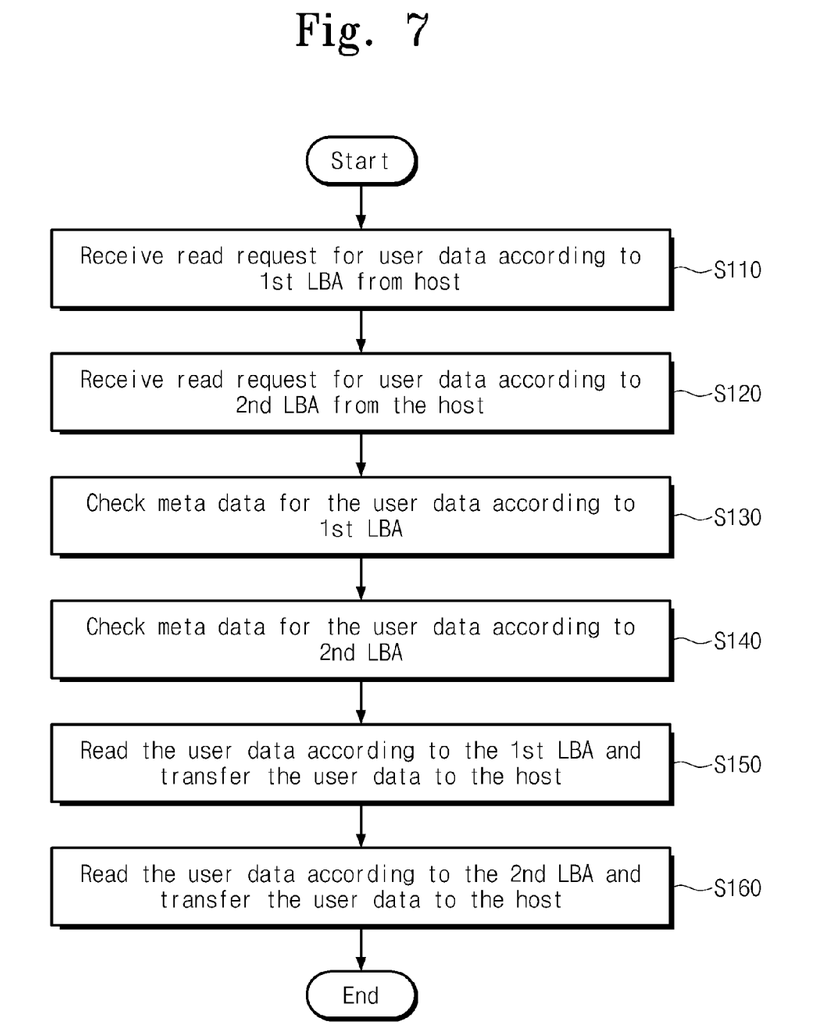
FIG. 7 is a flow chart schematically illustrating an operating method of a memory controller according to an example embodiment of the inventive concepts.

FIG. 7 is a flow chart schematically illustrating an operating method of a memory controller according to an example embodiment of the inventive concepts.

Referring to FIG. 7, a method of operating the memory controller 1420/2420 may include operations: receiving a read request for first user data corresponding to a first logical block address from a host (S110); receiving a read request for first user data corresponding to a second logical block address from the host (S120); checking metadata associated with the first user data (S130); checking metadata associated with the second user data (S140); transferring the first user data to the host (S150); and transferring the second user data to the host (S160).

The operations S110 and S120 can be performed at a same time. That is, the memory controller 1420 may receive the read requests for the first and second logical block addresses from the host at the same time. Alternatively, the operation S120 can also be performed after the operation S130. That is, the memory controller 1420 may receive the read request for the second user data after checking the metadata associated with the first user data.

At the operations S150 and S160, the first and second user data corresponding to the first and second logical block addresses, respectively, may be transferred to the host via a PCIe interface.

Figure 8:
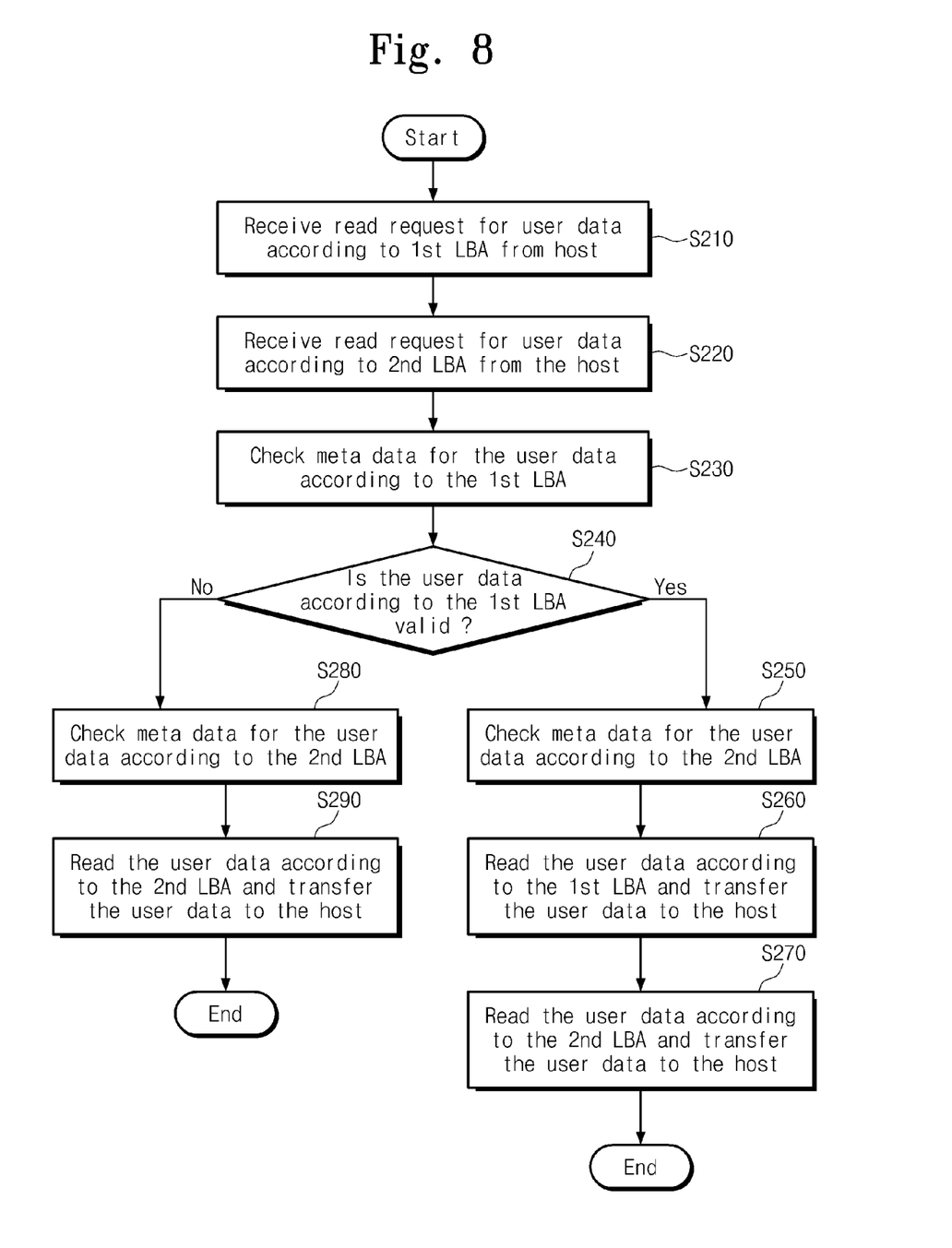
FIG. 8 is a flow chart schematically illustrating an operating method of a memory controller according to another example embodiment of the inventive concepts.

FIG. 8 is a flow chart schematically illustrating an operating method of a memory controller according to another example embodiment of the inventive concepts.

Referring to FIG. 8, operations S210 to S230 may be the same as operations S110 to S130 described with reference to FIG. 7. More specifically, the memory controller 1420/2420 may execute the operations of: receiving a read request for first user data corresponding to a first logical block address from a host (S210); receiving a read request for second user data corresponding to a second logical block address from a host (S220); checking metadata associated with the first user data (S230).

At operation S240, the memory controller 1420/2420 may determine whether the first user data is valid.

When a determination result of operation S240 indicates that the first user data is valid, the operations S250 to S270 may be performed. The operations S250 to S270 may be the same as operations S140 to S160 described with reference to FIG. 7. More specifically, the memory controller 1420/2420 may execute the operations of: checking metadata associated with the second user data (S250); transferring the first user data corresponding to the first logical block address to the host (S260); and transferring the second user data corresponding to the second logical block address to the host (S270).

When a determination result of operation S240 indicates that the first user data is invalid, the memory controller 1420/2420 may execute the operations of: checking metadata associated with the second user data (S280) and transferring the second user data corresponding to the second logical block address to the host (S290).

The operation S240 may be performed referring to metadata described with reference to FIG. 6. For example, whether the first and second user data is valid may be checked based on a bit "Valid" of the associated metadata.

Meanwhile, the operation S240 can be performed after the operation S250. For example, after checking metadata associated with the second user data, the memory controller 1420/2420 may check whether the first user data is valid.

The operating method may further include an operating of determining whether the first user data is valid before the operation S260 in which the first user data is transferred to the host.

Figure 9:
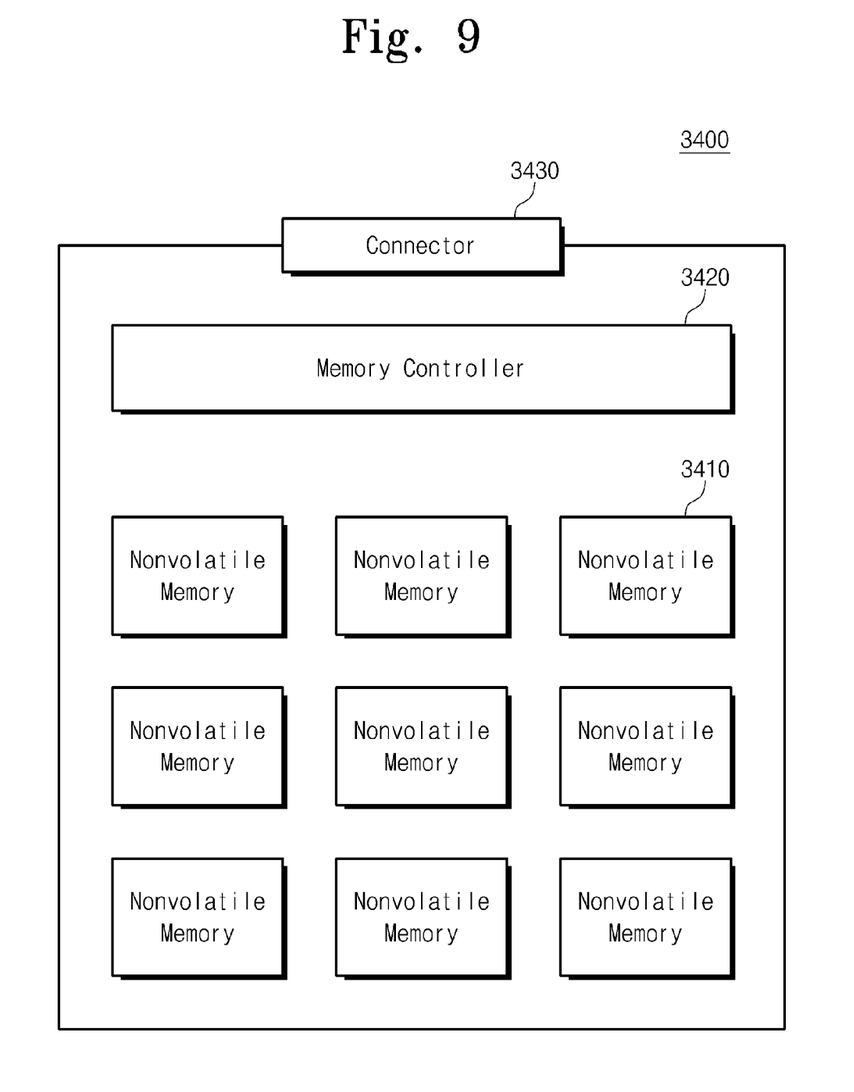
FIG. 9 is a block diagram schematically illustrating a storage device according to another example embodiment of the inventive concepts.

FIG. 9 is a block diagram schematically illustrating a storage device according to another example embodiment of the inventive concepts.

Referring to FIG. 9, a storage device 3400 may include a plurality of nonvolatile memories 3410, a memory controller 3420, and a connector 3430.

The memory controller 3420 may operate substantially the same as the memory controller 1420 and the memory controller 2420 described with reference to FIGS. 2 and 3, respectively.

The connector 3430 may connect the storage device 3400 with a host. For example, the connector 3430 may be a connector of a standard interface used at the host. The connector 3430 may be a connector of a PCIe interface.

The storage device 3400 may be a solid state drive (SSD). The storage device 3400 may be connected with a host (e.g., a server, a main frame, etc.) which requires high-speed and mass storage.

While the inventive concepts have been described with reference to example embodiments, it will be apparent to those skilled in the art that various changes and modifications may be made without departing from the spirit and scope of the example embodiment. Therefore, it should be understood that the above example embodiments are not limiting, but illustrative.

What is claimed is:

1. A method of operating a memory controller, the method comprising:
   receiving a read request for first user data corresponding to a first logical block address from a host;
   receiving a read request for second user data corresponding to a second logical block address from the host;
   checking metadata associated with the first user data;
   checking metadata associated with the second user data;
   transferring the first user data to the host before or after simultaneously checking the metadata associated with the second user data; and
   transferring the second user data to the host.

2. The memory controller of claim 1, wherein after providing the host interface with the first user data, the DMA controller is configured to provide the host interface with the metadata associated with the second user data.

3. The memory controller of claim 1, wherein when the checking indicates that the second user data is valid, the DMA controller is configured to provide the second user data to the host interface.

4. The memory controller of claim 1, wherein the metadata includes information indicating whether the associated one of the first and second user data is valid, Cycle Redundancy Check (CRC) information.

5. The memory controller of claim 1, wherein the buffer memory is a volatile memory.

6. The memory controller of claim 1, wherein the buffer memory includes a first buffer memory and a second buffer memory, the first buffer memory being a dynamic random access memory (DRAM) and the second buffer memory being a static random access memory (SRAM).

7. The memory controller of claim 6, wherein the first and second user data are stored at the first buffer memory and the associated metadata is stored at the second buffer memory.

8. The memory controller of claim 1, wherein the host interface is a Peripheral Component Interconnect Express (PCIe) interface.

9. A method of operating a memory controller, the method comprising:
   receiving a read request for first user data corresponding to a first logical block address from a host;
   receiving a read request for second user data corresponding to a second logical block address from the host;
   checking metadata associated with the first user data;
   checking metadata associated with the second user data;
   transferring the first user data to the host before or after simultaneously checking the metadata associated with the second user data; and
   transferring the second user data to the host.

10. The method of claim 9, wherein the read request for the first user data and the read request for the second user data are received at the same time.

11. The method of claim 9, wherein the receiving the read request for the second user data is performed after the checking the metadata associated with the first user data.

12. The method of claim 9, further comprising:
   determining whether the first user data is valid after checking the metadata associated with the first user data.

13. The method of claim 9, further comprising:
determining whether the second user data is valid after checking the metadata associated with the second user data.

14. The method of claim 9, wherein the transferring the first user data and the transferring the second user data to the host is performed using a PCIe interface.

15. The method of claim 9, wherein the metadata includes information indicating whether the associated user data is valid, Cycle Redundancy Check (CRC) information.

16. A memory controller comprising:
a buffer memory configured to store user data and associated metadata therein, the metadata indicating whether the associated user data is corrupted;
a memory controller configured to,
receive a request from a host for a plurality of the user data;
determine if each of the plurality of user data in the request is corrupted based on the associated metadata prior to or simultaneously with transferring a first user data of the plurality of user data to the host.

17. The memory controller of claim 16, wherein the memory controller is configured to determine if the plurality of user data is corrupted by,
checking the metadata associated with the first user data, and
checking the metadata associated with a second user data of the plurality of user data, and
the memory controller is further configured to transfer the first user data to the host after or simultaneously with the checking of the metadata associated with the second user data.

18. The memory controller of claim 16, wherein the memory controller determines whether each of the plurality of user data in the request is corrupted by reading a validity bit of associated metadata stored in the buffer memory.

19. The memory controller of claim 16, further comprising:
a host interface configured to send the requested plurality of user data whose associated metadata has been checked by the memory controller to the host.

20. A storage device comprising:
the memory controller of claim 16; and
a nonvolatile memory configure to provide the user data to the buffer memory via a bus.

\* \* \* \* \*